United States Patent [19]

Laakaniemi et al.

[11] 4,456,168
[45] Jun. 26, 1984

[54] MODULAR FLUID CONTROL APPARATUS AND METHOD OF MAKING

[75] Inventors: Richard N. Laakaniemi, Hales Corners; Paul E. Wichman, Brookfield, both of Wis.

[73] Assignee: Johnson Controls, Inc., Milwaukee, Wis.

[21] Appl. No.: 227,493

[22] Filed: Jan. 22, 1981

[51] Int. Cl.$^3$ .............................................. F24F 7/06
[52] U.S. Cl. ...................................... 236/49; 137/884; 403/13
[58] Field of Search .................. 137/884; 403/13; 339/186 M; 165/16; 236/49

[56] References Cited

U.S. PATENT DOCUMENTS

| | | | |
|---|---|---|---|
| 2,928,998 | 3/1960 | Brumfield | 339/186 M X |
| 3,166,372 | 1/1965 | Just | 339/186 M |
| 3,572,368 | 3/1971 | Bullmer | 137/884 X |
| 3,646,963 | 3/1972 | Klee | 137/884 |
| 3,656,510 | 4/1972 | Kinner | 137/884 |
| 3,707,989 | 1/1973 | Jullien-Davin | 137/884 |
| 3,814,126 | 6/1974 | Klee | 137/884 |
| 3,963,301 | 6/1976 | Stark | 339/186 M |
| 4,095,863 | 6/1978 | Hardin | 137/884 X |
| 4,095,864 | 6/1978 | Hardin | 137/884 X |
| 4,167,200 | 9/1979 | Bouteille | 137/884 |
| 4,183,373 | 1/1980 | Kay | 137/884 X |
| 4,199,101 | 4/1980 | Bramow et al. | 236/49 X |

Primary Examiner—William E. Tapolcai
Attorney, Agent, or Firm—Andrus, Sceales, Starke & Sawall

[57] ABSTRACT

A modular pneumatic control apparatus controls a mixed air handling units in an air conditioning system. The apparatus includes a single configured manifold module plate having a plurality of function module plug-in connectors and a plurality of input/output plug-in connectors. Function modules have complementary plug-in connectors for connection to the manifold module are designed with common opposite outer plates having surface passageways abutting a center plate with openings to define a particular circuit. The outer plates have all external ports for defining any function module used in any system. The manifold module is a constant architecture and acts as an interface between the system sensors and load devices and the function modules which create the desired complex control systems. Only a relatively small number of function modules are required. An interactive computer based design procedure can produce a series of questions to define the necessary function modules and supporting components and connections to completely design a system with only a minimal understanding of the control instrumentation and their characteristics.

24 Claims, 16 Drawing Figures

MODULAR FLUID CONTROL APPARATUS AND METHOD OF MAKING

BACKGROUND OF THE PRESENT INVENTION

This invention relates to a modular fluid control apparatus responsive to pneumatic input signals for developing pneumatic output control and operating signals and to a method of making the modular control apparatus for a fluid control system and particularly to such a modular fluid control apparatus specially adapted for controlling the conditioning of environmental air supplied to a building enclosure.

Control systems responsive to various input signals and developing controlling and operating signals are used in various industrial applications. Although such systems generally use electrical and electronic circuits and components, fluid control systems have been developed and advantageously used in various applications. Electronic control systems which have been developed may use various circuit board approaches. Fluid control systems also have been widely used in industrial type controls and have also been particularly applied to heating, ventilating and air conditioning control systems wherein pneumatic signals are generated for controlling the temperature and humidity of air supplied to building enclosures. Such systems have been particularly applied to institutional, commercial and industrial applications where relatively complex control systems are required. A particularly satisfactory conditioning control system uses a constant air flow through the system with controlled introduction of fresh air and exhaust of stale air in combination with a means for heating, cooling and humidifying the air prior to supply to the conditioned zone or zones of an enclosure. The simplest system provides continuous introduction of outside air with 100% exhausting of return air. A mixed air system is advantageously used to reduce the energy consumption. In mixed air systems, a portion of the exhaust air is returned to the supply with selective varying of the volume of return air, generally depending upon the relative energy content state of the outside and return air. In all such systems separate heating, cooling and/or humidification units are mounted in the zone supply duct or passageway. The duct includes an outdoor air input and in the mixed air systems a return air input connected to the outlet duct upstream of an exhaust air duct. Damper units are provided in the outdoor air duct, the exhaust duct and the return duct for selectively controlling the mixture of air supplied to the conditioned zone. The design of the control systems may be relatively complex when applied to multiple building or a large building complex. The necessity for sophisticated control systems has been intensified by the energy crisis. The custom design of such sophisticated systems requires skilled personnel having a broad knowledge of the various components and subsystems available. Pneumatic control systems have been and are individually designed and constructed with the various signals interconnected through special circuit design to provide the desired functional control. It is this interaction within the circuit which particularly is effected by the broad knowledge and the level of technical skill of the designer as well as an intimate knowledge of the installation. Although the various standard input/output control and modifying components are well known, the circuit design using such components and the circuit connection is a difficult and time consuming process as the complexity of the systems increases. A custom design therefore is not only expensive but is subject to the technical ability of the field personnel involved in selling and designing of heating, ventilating and air conditioning systems. For example, the outdoor air control normally is based on the relative condition of the outdoor air and the return air as well as the interrelationship of various zone signals and the like and operates to control a position of the several dampers. For example, it might be desired to provide natural cooling whenever the outdoor air contains less energy than the return air. Minimum ventilating may be required even when the outdoor air energy is greater than the return air. The system must also consider the damaging effect which can occur if abnormally low temperature air is introduced into the system which may cause component freeze-up. These and similar interrelated controls are required in most sophisticated mixed air systems for heating, ventilating and air conditioning of air. Many other basic functional factors must also be considered in the design of the system for operating the dampers, the heating means, the cooling means and the humidifying means depending upon the requirements specified for the air supplied to the conditioned zone.

Further, the field installation with the required system interconnections present a further source of possible error in the construction of the system.

There has been and is a very significant need for some method of simplification in the designing and construction of pneumatic control systems but the system components have not been integrated into an appropriate modular system, such as in electronic systems.

SUMMARY OF THE PRESENT INVENTION

The present invention is particularly directed to a modular fluid control apparatus which includes a single configured manifold unit having a plurality of load connectors for controlling particular functional load or operating devices in combination with function module connectors for connection to a family of releasably connected function modules. The function modules are classified by functions, with each function provided with a basic circuit board from which a family or plurality of different configured function modules are created by proper releasable connection of appropriate logic devices and control devices for producing different and particular related control functions to the related operating device in a system. A wide variety of final control systems may be derived from a selected combination of the different families of function modules. The manifold module is mounted to a suitable support and the function modules are connected to the connector sections. The input/output signals from signal sensors and to the operating devices are coupled to the modules through the manifold unit. Appropriate options can be and will normally be provided, such as conventional flow boosters, output sequences, input controllers and the like. Such devices may be standard known components which can be readily incorporated into the basic architecture without changes in the circuit connections within the function modules or the manifold module. The manifold module is thus a constant fixed architecture providing for the input/output connections to the several function modules and the receipt of plug-in options, such as flow boosters, sequencers and the like. The function modules have standard input ports for receiving of the basic input signal from the sensor and internal circuitry for developing particular output signals for the related functions. Such output signals are transmitted through the manifold module whereby the selection of the function modules creates the necessary architecture to produce a selected one of the wide variety of complex systems possible by combining of different function modules. The inventors have found that a relatively small number of function modules related to the basic functions used in a control system can be predesigned with simple plug-in interconnection to a common manifold to produce a wide variety of complex and sophisticated control systems.

The plug-in modular construction also adapts the system to an interactive computer based design procedure. The design engineer may then design a complex based on the functional requirements of the system to be controlled, with only a minimal understanding of the control instrumentation and their characteristics required. The interactive system produces a series of a computer presented questions with multiple choice or simple direct answer required. The necessary functional modules for the defined system connection, as well as optional modifications, can be directly translated by the computer and recorded, which are modules established by the responses. The computer control system can of course have various interrelated checks to prevent noncompatible system designs. Such computerized analysis has generally been used in other fields; for example, automotive diagnostic procedures have been based on an interactive computer based series of questions and answers. For example, in design of heating, ventilating and air control systems, the simplified modular system is such that a control engineer can design the necessary control system for over ninety percent of the heating, ventilating and air handling units presently in use, using only 42 available function modules and standard input and output signal processing devices. Such a design system may establish convenient assembly, calibration, testing and the like. The predesigned instruction for a particular module may be stored and presented as a part of the final design print-out.

The present invention has been particularly applied to pneumatic control systems for controlling air handling units in complex mixed air heating, ventilating and air conditioning systems. The present invention is thus particularly described in connection with the unique air handling control systems developed for such a constant volume flow systems including a 100% outdoor air system, a single path mixed air system and a dual path mixed air system. The control unit includes five functional modules for five basic control functions including outdoor air sensing, outdoor air control, air cooling control, air heating control and humidity control along with auxiliary condition signals such as fan status. The functional design separation minimized air connection between the modules, established similar size modules and defined separate functional areas within which a system may be changed without effecting the other functions.

In this unique embodiment the manifold module and the functional modules are similarly constructed as flat rectangular shaped units including opposed outer plates separated by a center plate. The one outer plate has longitudinally extended passageways along the longer dimension of the module and the opposite plate has laterally extended passageways along the shorter dimension of the module to define an X-Y grid pattern. The center plate includes openings for connecting of selected passageways to define the particular desired fluid circuits.

The manifold module includes a series of identical plug-in connectors along the one edge for receiving a complementary plug-in connector from a functional module. The opposite edge includes a series of load connectors, generally functionally aligned with the plug-in connectors, and connected thereto by the internal passageways.

The functional modules have external ports for selective connection of the passageways within each plate. Each functional module is thus prewired to a particular functional system.

In a preferred embodiment, the functional modules are designed with common outer plates and with a unique center plate which defines the particular function class. The outer plates have all of the necessary external ports for defining any one of the function modules used in any system which may be built from available functional modules. Functional modules are preformed by interconnecting of the necessary ports directly or with appropriate circuit components and all other ports are sealed or vented to atmosphere. The functional modules are then available as preformed and tested circuit modules for plug-in attachment to the manifold module.

The system thus provides a modular pneumatic circuit board system permitting the convenient commercial production of a complex but reliable fluid control system at a minimal cost. Further, the pretested modules may of course also be used to create a relatively simple overall control system at a competitive cost. The functions not used in such a system may be sealed with a suitable blank module.

DESCRIPTION OF THE DRAWING FIGURES

The drawings furnished herewith illustrate a preferred construction of the present invention in which the above advantages and features are clearly disclosed as well as others which will be readily understod from the following description.

In the drawings.

DESCRIPTION OF THE ILLUSTRATED EMBODIMENT

Figure 1:
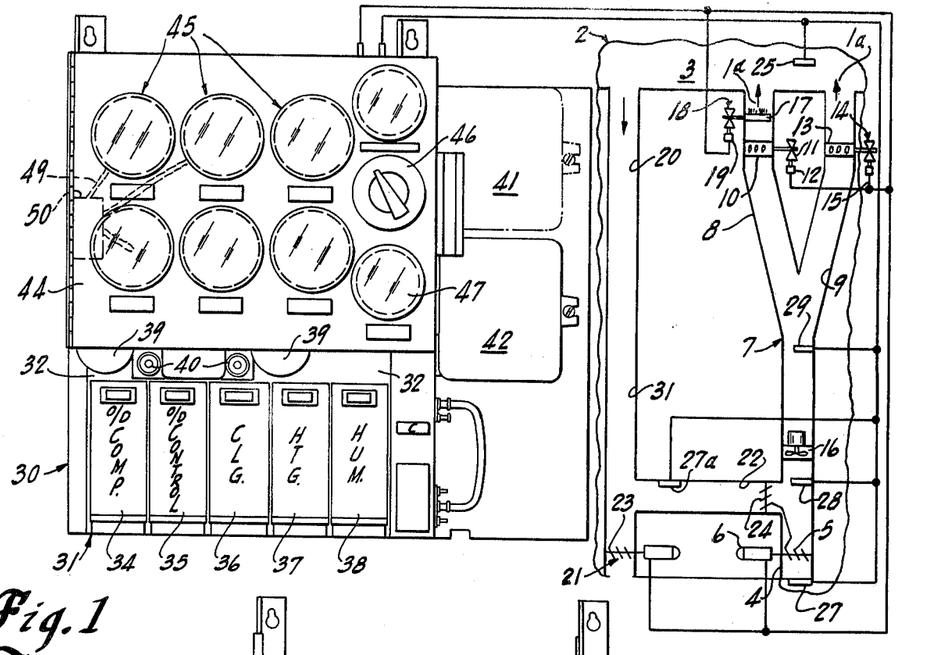
FIG. 1 is a schematic illustration of a mixed air handling system incorporating a modular control unit constructed in accordance with the teaching of the present invention.

Referring to the drawings and particularly to FIG. 1, the present invention is shown for controlling of a mixed air dual path air handling system for supplying conditioned air 1 and 1a to an enclosed area or building 2 which may include one or more zones 3. The system includes an outdoor air duct 4 terminating in the exterior wall of the building. A pneumatic operated damper 5 is mounted within the duct opening and operated by a pneumatic cylinder motor 6 for selective opening and closing of the outdoor air duct 4. The duct 4 extends inwardly to a supply duct 7 which branches into a heating duct 8 and a cooling duct 9 which respectively discharge into the zone 3. The heating duct 8 includes a heating source, such as coil 10 piped to a source of hot water or the like for heating of the air 1a as it passes through the heating duct and into the conditioned zone 3. The heating coil connection includes a flow control valve 11 having a pneumatic operator 12 for selectively supplying of hot water to the heating coil 10 to heat air stream 1a for delivery to zone 3. The cooling duct 9 similarly includes a cooling coil 13 piped to a source of cold water or the like. The cooling coil connection includes a similar control valve 14 having a pneumatic operator 15 for selectively supplying of cold water to the cooling coil for cooling of the air 1 supplied to the conditioned zone 3. A fan 16 is mounted in the common supply duct 7 for moving of air through the supply duct 7 and the heating and cooling ducts 8-9 for creating the movement and supply of air 1 and 1a to the conditioned zone 3. In addition, a moisture supply pipe 17 is shown mounted in the mating duct and connected to a source of water. A controlled valve 18 in the connection line has a pneumatic operator 19 for controlled supply of moisture to the air as it flows through the common duct 7. The supply of air is balanced by exhausting a corresponding quantity of air through an outlet duct 20. An exhaust duct 21 is connected to the outlet duct and, in the mixed air system, a return air duct 22 is connected between the outlet duct 20 and the supply duct 7. The exhaust duct 21 extends to the exterior of the building. A pneumatically operated damper unit 23, similar to the outdoor air damper unit 5, is mounted in the exhaust duct to control the exhaust of the outlet air from the building. The outlet air which is not exhausted is diverted through the return air duct 22 to the supply duct 7 immediately upstream of the fan. The return air duct 22 is also provided with a damper unit 24 for controlling the opening and closing of the return duct in complementary relation to the outdoor air damper. Thus, return air damper 24 may be suitably coupled to the outdoor air damper 5 as by a mechanical linkage to proportionately but oppositely position the dampers 5 and 24.

The exhaust air damper 23 and the outdoor air damper 5 are generally connected to a common control to maintain a balanced air flow into and out of the system. The dampers 5, 23 and 24, as well as the heating, cooling and humidification devices 10, 13 and 17, are generally controlled in accordance with various load demands, outdoor air conditions and other operating conditions of the overall system. For example, as diagrammatically illustrated, a sensor or sensors 25 are provided in the comfort zone 3 to provide a demand signal related to the temperature and/or humidity of the air in the zone 3. An outdoor air temperature sensor 27 is mounted to sense the outdoor air and provide corresponding related signals. The condition of the return air may be monitored by sensors 27a. The condition of the mixed air may be monitored by an appropriate sensor 28 located immediately upstream or downstream of the fan unit 16. Further, the pressure conditions in the supply duct may be continuously monitored by suitable sensor 29 located in duct 7 to provide a corresponding fan status signal. All such devices, as well as others, are well known components used in air handling systems and consequently no further detailed description thereof is given. The several sensors are connected as input signals to a pneumatic control apparatus or unit 30 which develops operating output signals for driving the pneumatic units of the several dampers 5, 23 and 24, as well as the valves of the illustrating heating, cooling and humidification devices 10, 13 and 17. The dual path mixed air system is shown for purposes of illustration. The total system, as described, provides for developing of the control unit for controlling a single path system wherein a single cooling and/or heating duct is provided with separate treating units or an alternate operating unit in such duct, as well as a simple 100% outdoor air unit wherein the return air duct is eliminated.

The illustrated control apparatus 30 is constructed in accordance with the present invention as a modular pneumatic circuit control unit including a mounting frame 31 for mounting of the control in a suitable cabinet or the like, not shown. The control apparatus 30 includes four basic components including a main manifold circuit board 32 secured to the mounting frame, a plurality of functional modules 34, 35, 36, 37 and 38, a series of output signal modifier 39 and 40 and suitable input controllers 41 and 42. The manifold board 32 includes a series of four output connectors mounted to one edge of the board and a plurality of function module connectors along the opposite edge of the board in the illustrated embodiment of the invention. The five functional modules 34–38 are releasably connected by complementing connectors to the manifold and supported within the frame 31. The plug-in functional modules 34–38 have particular circuit designs to produce particular functions uniquely related to the basic functional requirements of an air handling control system for essentially all air handling units. Thus, in the illustrated embodiment of the invention and as more fully developed hereinafter, the five functional modules 34–38 include an outdoor air sensing module, an outdoor and return air damper control module, a cooling control module, a heating control module and a humidity and auxiliary signal control module. Each module can only be replaced by a similar functional module, with the particular function module selected to produce the desired processing of appropriate input signals to develop a related output signal for operating the air control dampers and/or the air treating devices. The manifold module 12 serves as the interface between the input signals to the function modules and the output signals from the function modules.

Figures 2, 3:
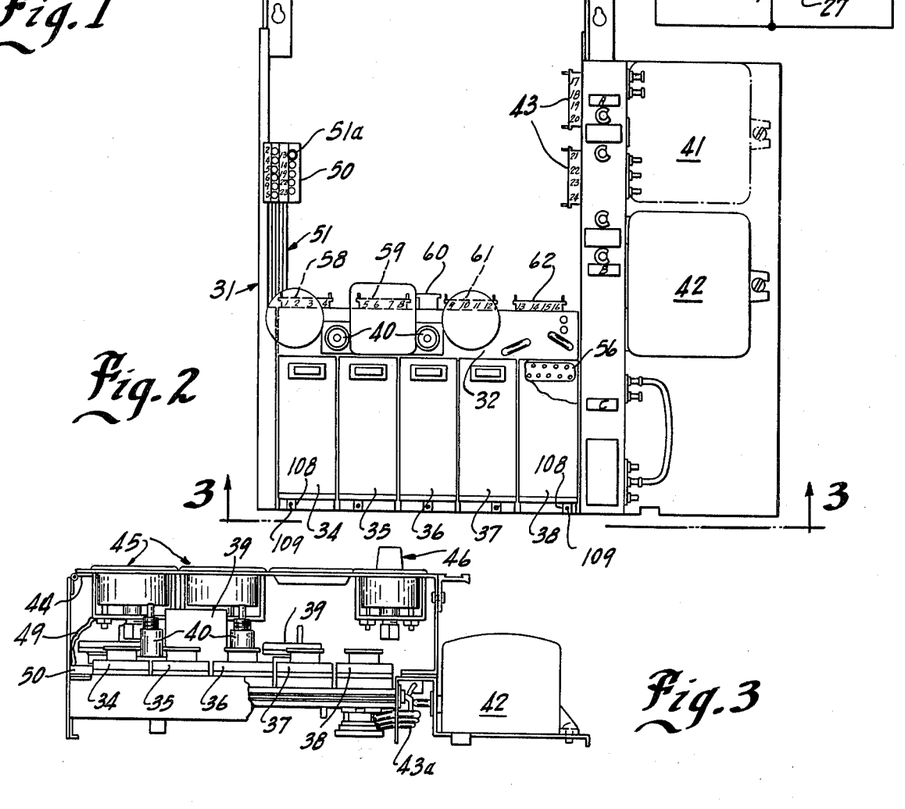
FIG. 2 is an enlarged view of the control unit shown in FIG. 1 with certain components removed and more clearly illustrates the structure of the illustrated embodiment.
FIG. 3 is an end view of the control unit shown in FIGS. 1 and 2, taken generally on line 3—3 of FIG. 2.

In accordance with conventional practice, the input and output signals may be desirably provided with certain interrelated sequencing or modifying controls. For example, the input controller is normally provided to modify the input signal to provide a proportional and-/or proportional plus integral modified signal to the function modules. Typical controllers 41 and 42 are shown mounted to the mounting frame 31 to the one side of the modular units 34–38. The input controller is an essentially standard unit which modifies the signal from the sensor 3 and delivers the modified signals to the function module. The controller, for example, may be a proportional plus integral controller or the like. High or low limit response may be made by suitable interconnection of adjustable restrictors or regulators, not shown, connected within the tubing harness to the manifold module 32 within the mounting frame 31. Such controllers are commercially available. For example, Johnson Controls, Inc. of Milwaukee, Wis. sell various input controllers under the identifying series numbers T-9000, T-9110 and T-9111. Where the input signal is applied to a controller, a limiter or the like, additional input connectors 43 are provided, as shown in FIG. 2, with the tubing harness 43a passing through a U-shaped side channel to the controller 41 or 42 and from the controller to the manifold module 32, as shown in FIG. 3, for proper connection to the appropriate function module 34–38, inclusive.

The output signals may also be modified. For example, it may be desired to increase the output flow capacity, reverse the signal, or provide particular sequences. Modifying plug-in units 39 shown provided on the manifold module 32 may be suitable reverse or direct acting booster relays which are connected to the output circuit within the module 32 to establish modification of the output signals. Similarly, plug-in units 40 may be well known sequencers connected to control the output signals. Thus, the sequencer and/or booster devices provide for controlled sequencing of the load devices and increasing the level of the output signal such as the total flow for proper operation of the air handling equipment. The system has been constructed in practical design to accept up to three sequencers of two different types and four boosters of two different types which are constructed to be plugged into the appropriate ports of the manifold module 32, as more fully described hereinafter.

In addition to providing the proper operating signals to the various system operating devices, the various output pressures and sensed conditions may be displayed at the control 30. In the illustrated embodiment of the invention, a gauge plate 44 is shown interconnected to the mounting frame 31 with a plurality of different gauges 45–47 mounted therein. For example, it may be desired to provide various room discharge temperature readings of the zone, the outdoor air and the like. A manual summer-winter switchover control unit 46 is shown for manual selection of the winter-summer setting. A fan status indicator 47 is shown to indicate when the fan is on and off. The gauges 45–47 are conveniently mounted directly onto the plate 44. The plate 44 is preferably hinged as shown, to one edge of a vertical wall to one side frame with the plate overlying the frame. The various gauges and control switches are connected through suitable tubing 49 to the output of the manifold module 32. In the illustrated embodiment, a stake-type port connector unit 50 is provided along the side of the mounting frame structure beneath the gauge plate for connection of the gauge tubing. The several ports are connected directly to the appropriate output line of the manifold module 32, of the input controllers or other input element through the tubing harness 51. Of course, the gauge ports 50, which are not used, are plugged with a suitable cap member 51a.

As noted previously, the function modules are particularly selected because of the convenient practical application to air handling equipment. Thus, the component structure for the several controlled functions will be found to require generally similar sized circuits and circuit components, thereby providing for essentially standardization of the modular size. Further, the described function modules identifies separate isolated functions which require minimal air passages between the several modules. Finally, any design change within a designed system will normally involve one or two functions and modifications of the modular system will normally only require replacement of one or two function modules.

More particularly, the outdoor air sensing module functions to measure the temperature and/or enthalpy of the outdoor air as detected by sensor 27 and compares such level with the corresponding level of the return air as detected by sensor 27a or a fixed reference. The circuit of the module generates control signal depending upon whether the level of the outdoor air is higher or lower than that of the return air or the fixed reference. The output signal is transmitted to and by the manifold module 32 to select the lower energy air stream, determine whether or not heating or cooling of the air should be created and the like. The signal will be readily recognized as a basic summer-winter signal because low outdoor air energy normally exists in winter while high outdoor energy exists during summer conditions.

The module 35 provides for outdoor and return air control and operates the dampers for controlling the relative supply of the outdoor air and/or the return air supplied via the return air duct 22. The air control module 35 receives its basic signal from the outdoor air sensing module 34 as well as other interrelated signals, such as zone signals, fan status signals and the like. The module 35 thus produces outputs for controlling the position of the outdoor damper 5, the return air damper 24 and the exhaust air damper 23. The particular air control module 35 is selected from the available family of modules to provide various desired functions. Thus, the module 35 can serve to modulate the actual cooling of the air 1 and 1a to zone 3 with outdoor air whenever the outdoor air contains less energy than the returned air. It is generally desired that regardless of the outside air conditions, certain minimum ventilation is provided. The signal can be employed whenever the outdoor energy is greater than that of the return air energy to set the dampers to provide maximum return air and the minimum required amount of fresh air while maintaining a balanced air flow. The air control module can also provide for controlling the temperature of the mixture of the outdoor air and the return air in response to the signal from the mixed air sensor 28. The proper module 35 also establishes protection against freezing of the coils 10 or 13 by closing damper 5 if the air supplied to the supply duct 7 is below a selected level, if the fan should shut off or the like. The air control module receives an appropriate signal from a suitable available warm-up or cool-down controller connected to the input to the module via the manifold module. The module will transmit the warm-up or cool-down signal during the morning or evening hours. Thus, it is desirable to control the rate of heating and cooling a building in the morning if the temperature has been set during the night time for energy conservation and the like. Such controllers are readily commercially available. Johnson Controls, Inc. of Milwaukee, Wis. has a line of controllers identified by the series numbers C-7510 and C-7610 and the like. Where the cooling system incorporates a preheat coil, not shown, the discharge temperature may be regulated to 40 degrees fahrenheit to prevent statification, coil freezing and the like.

The cooling control module 36 is preferably designed to allow temperature and/or humidity control signals to control the cooling apparatus 13 directly or through a discharge controller. In a discharge control system, a dual input controller, which is part of control unit such as unit 41 or 42, controls the cooling apparatus and is readjusted by various zone control signals. The cooling control module includes a logic output which closes the valve 14 preventing coolant circulation if outdoor air temperature is below an adjusted setting, known as the cooling lock-out setting. The lock-out is desired to prevent transient load from using mechanical refrigeration whenever sufficient natural cooling is available. The cooling control module may also be connected to the output of outdoor air module and if the temperature drops below a selected minimum level, such as 35 degrees F., the valve 14 is opened to maintain continuous coolant circulation which will prevent coil freezing. The cooling control module may also be connected to the humidity signal from the humidity module to override temperature signals and provide dehumidification for high limit humidity applications. If a single heating-/cooling coil is employed in a single path system, the signal from the outdoor sensing module may provide switching between heating and cooling, with the modules 36 and 37 providing appropriate modulation of the cooling and heating.

The heating control module 37 provides an output control signal for operating the valve 11 for the heating coil 10, and as with cooling, may provide direct signal control or through a discharge control, such as a dual input controller, to control the heating coil with appropriate readjustment in response zone temperature signals. The heating control module 37 can also provide modulation of the air flow dampers 5, 23 and 24 whenever the outdoor temperature drops below a particular minimum temperature, and alternately modulate water flow through the heating unit when the outdoor temperature is above the selected minimum temperature. The particular module selected will of course determine the type of control and thus the system architecture as desired. If a single heating/cooling coil is used, the heating control module 37 may also have a circuit controller changeover between heating and cooling. Also, if the system permits, a heating module 37 can be presented to provide for enabling and disenabling of the face and bypass systems in response to fan failure.

The family of humidity control modules 38 includes various circuits for humidity sensing and control. As developed hereinafter, the module also provides other auxiliary control conections and signals. Humidity sensing devices, which may form a part of sensors 25, 27, 27a or 28, provides signals for controlling the humidification unit 17, with the control normally actuated in conjunction with the cooling control module 36 to provide optimum cooling based upon the humidification. The humidity control module 38 provides for separate set point adjustment for humidification and dehumidification, with the set points generally being lower for humidification and higher for dehumidification, although a single set point may be used. It is well known that humidification control is highly desirable to provide optimum comfort while minimizing energy consumption. A humidity control module can be selected to disable the humidifier in response to fan shut down, as well as provide for an auxiliary output signal depending upon the relative state or on-off logic signal based upon whether the outdoor air energy is above or below a selected level.

This module 38 is also interconnected to the cooling module to output the summer/winter signal from the outdoor sensing module. This module is also employed to transmit the fan status signal from the input signal transmitter to the other modules, such as previously described for use in "fan shut down" strategy.

Specific circuit configurations for several modules are more fully shown and described in the inventors' copending application filed herewith and entitled "Function Control Module", and assigned to a common assignee with this application. These and similar specific circuits may be readily provided by those of ordinary skill in the art of designing heating, ventilating and air conditioning systems.

Figures 4, 5, 6:
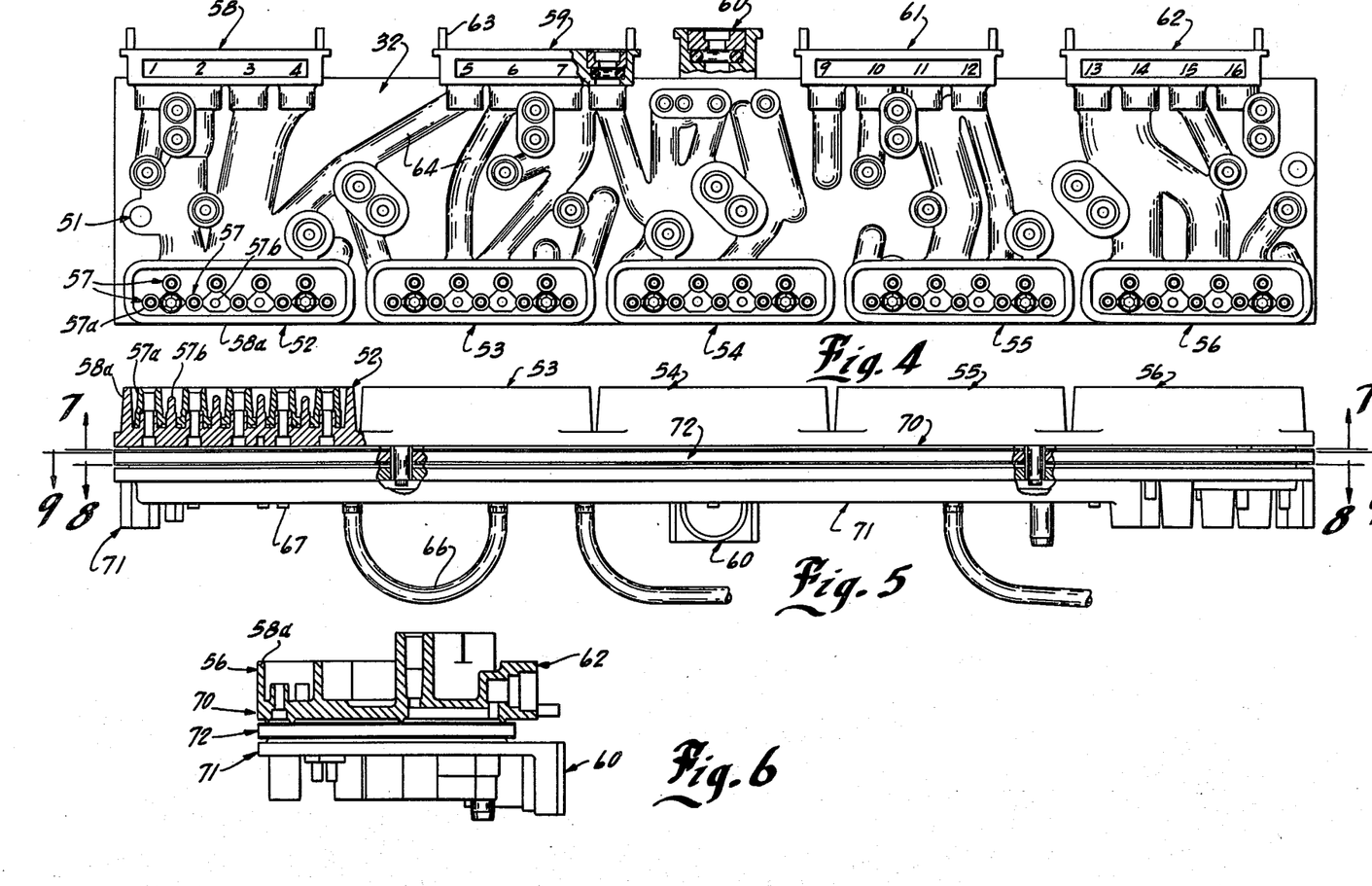
FIG. 4 is a separate enlarged view of the main manifold module and frame subassemblies shown in FIGS. 1-3.
FIG. 5 is a side elevational view of the manifold module shown in FIG. 4 with parts broken away and sectioned.
FIG. 6 is an end view of FIG. 5 with parts broken away and sectioned.
Figure 15:
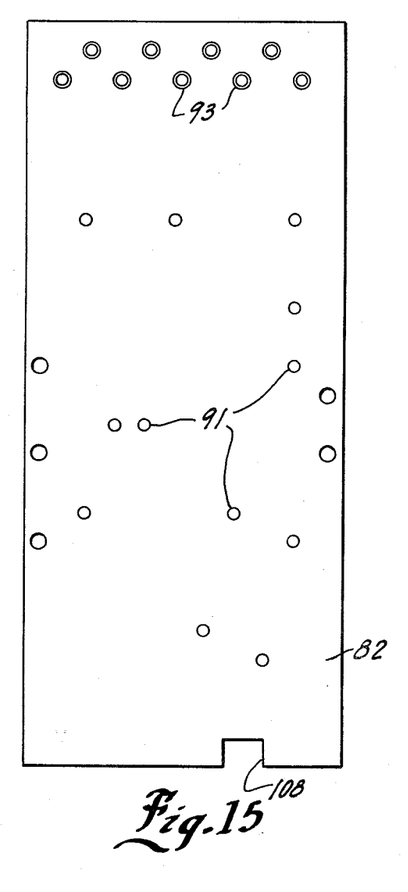
FIG. 15 is a view of the connecting plate between the top and bottom plates of a function module and taken generally on lines 15—15 of FIG. 11.

More particularly, manifold module 32 is a flat, plate-like assembly of a generally rectangular construction. The module 32 is mounted within the frame as by suitable attachment screws 51, generally centrally of the U-shaped frame. The module 32, as most clearly shown in FIG. 4, includes five separate module connectors 52, 53, 54, 55 and 56 which are equally spaced across the longer side of the module. The illustrated connectors are multiple port units, each shown as including nine different connecting ports 57, similarly spaced within the connector, within an encircling wall 58a. The ports 57 are shown with socket-like tubular members 57a, as shown in FIG. 15, to which a plug-in spigot type port member may be releasably secured. The port members 57a are formed of a suitable rubber material and are shown with interconnecting ribs secured to a support post 57b to provide a stable and reliable releasable connector assembly. The modules 33–38, as hereinafter described, are provided with corresponding plug-in spigot members for frictional insertion into an aligned port member 57a. The module 32 includes interface connecting circuits generally aligned with and extending across the module in sections generally corresponding to the connectors for connection to input/output or signal and load connectors 58, 59, 60, 61 and 62 correspondingly spaced along the opposite edge of the module. The connectors 58, 59, 61 and 62 are multiple port connectors for connection of appropriate input signals and output signals for connection to the operating units, such as the damper operators and the coil control valves and the like. The connectors 58–62 are also plug-in type units with suitable interconnecting end guide members 63. The connections 52–56 are formed with socket-type units, such as shown in FIG. 6, to receive a suitable connecting plug. The several circuits are generally shown in FIG. 4 by outer passageways 64. Each section is provided with special interconnecting ports suitably spaced and connected to internal passageways or lines for connection of the output signal and modifying devices 39 and other circuit elements. The sections are not completely distinct but provide for cross-section between adjacent module connector and load connectors. The underside of the module is provided with limited ports for some interconnection between the fluid signal processing circuits as by connecting tube 66, shown in FIG. 5. Any port in the module 32 which is not connected in circuit is sealed by a suitable press-fitted cap 67, or vented to atmosphere as a reference.

As previously discussed, the manifold module 32 is advantageously constructed as an integrated stacked-plate assembly, generally such as disclosed in the U.S. Pat. No. 4,188,977. As more fully disclosed therein, preformed molded top and bottom plates 70 and 71 are secured to the opposite faces of a central plate 72 by a suitable adhesive bonding to form an integral module body.

Figure 7:
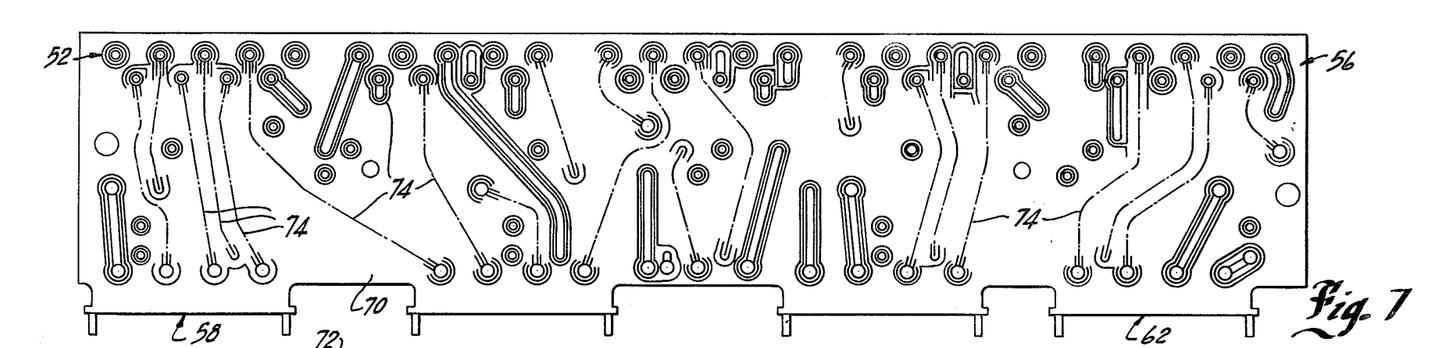
FIG. 7 is a view of the top manifold plate shown in FIG. 5 and taken generally on line 7—7 of FIG. 5.
Figures 8, 9, 9A:
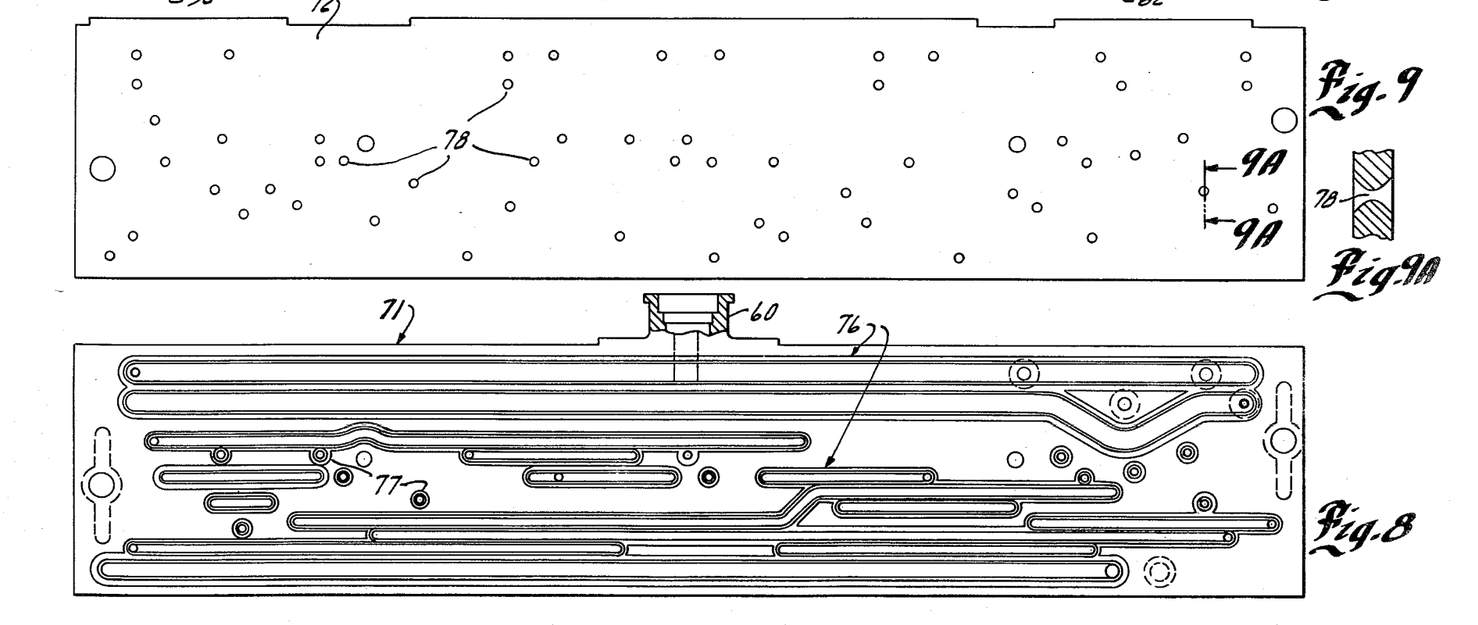
FIG. 8 is a view of the bottom manifold plate shown in FIG. 7 and taken generally on line 8—8 of FIG. 5.
FIG. 9 is a similar view of the central manifold plate and taken generally on line 9—9 of FIG. 5.
FIG. 9a is a fragmentary sectional view taken generally on line 9a—9a of FIG. 9.

As more fully shown in FIGS. 7-9, the opposed walls of the top and bottom plates 70 and 71 are formed with flow passageways which are selectively interconnected by openings in the center plate 72. More particularly, the top plate 70 includes a plurality of generally parallel passageways 74 extending laterally across the short width of the module. Certain passageways 74 extend into the portion of the connectors 52-56 and 58-62, inclusive, with the connecting ports terminating therein. These latter passageways 74 are selectively connected to receive and transmit the input and output signals directly or through the interconnecting auxiliary components 39-42 by intermediate port openings 75, shown in FIG. 7, and in some cases, tubing connections.

The bottom plate 71 is formed with a plurality of parallel connecting lines or passageways 76 having the intermediate port openings 77 for interconnection as by tube 66 or sealing by a plug 67. The central plate 72 includes selectively placed openings 78 in common alignment with certain passageways 74 and 76 in plates 70 and 71 to provide circuit connections for transmission of the input and the output signal between the several connectors and the signal processing devices applied to modify the input and the output signals and to provide special connection to the function modules 34-38. The passageways 76 are thus extended substantially 90 degrees to the lateral passageways 74 to define an X-Y grid pattern for simplicity in layout of the system and definition of the location of the several components to be attached to the module.

The manifold module 32 is a fixed configuration for all possible systems and serves as an interfacing device between the function modules 34-38 and the external system devices and the input and output signal and modifying devices forming an integrated part of the control 30.

In contrast, the function modules 34-38 are formed of a similar basic construction but having circuits uniquely constructed to provide the various different signal processings to produce the desired function in the overall control system.

Figure 11:
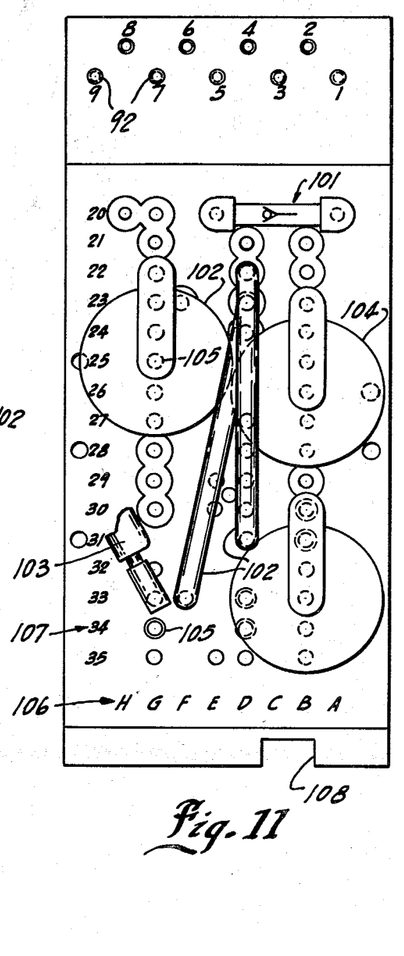
FIG. 11 is a bottom view of a function module.
Figure 12:
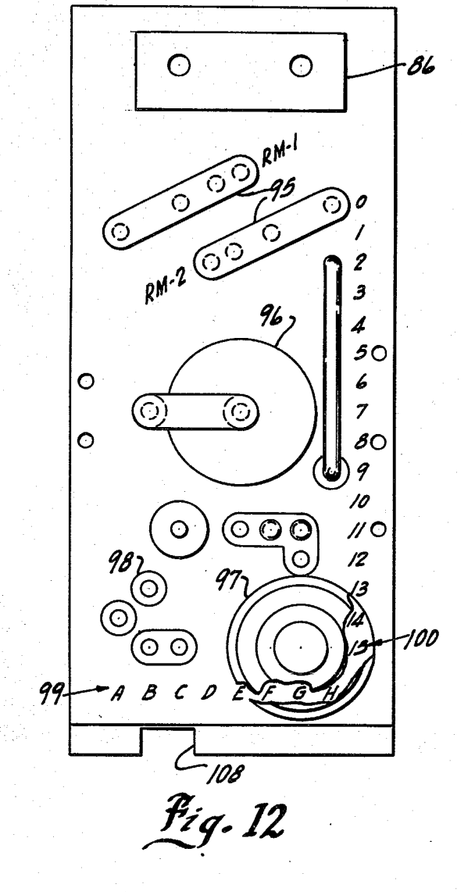
FIG. 12 is a top plan view of a function module.
Figure 13:
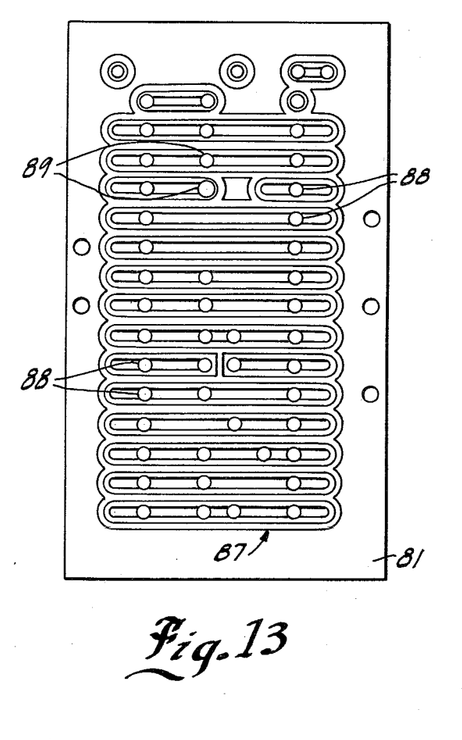
FIG. 13 is a view of the inner wall of the top function module plate shown in FIG. 11 and taken generally on line 13—13 of FIG. 11.
Figure 14:
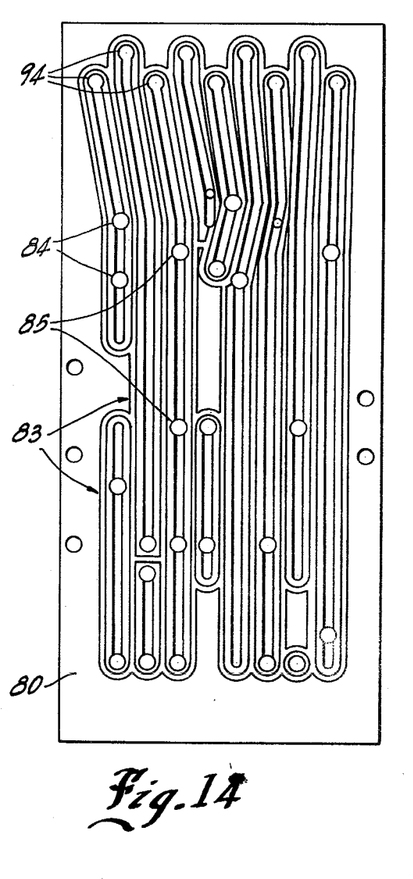
FIG. 14 is a view of the inner face or wall of the bottom function module plate shown in FIG. 12 and taken generally on line 14—14 of FIG. 11.

Each function module 34-38 is preferably also a multiple layered plate assembly, generally such as more fully disclosed in U.S. Pat. No. 4,188,977 which issued Feb. 19, 1980 and more fully described in the inventors' previously identified application. Referring partiucularly to FIGS. 10-15, a typical module 34-38 includes a top plate 80 and a bottom plate 81 separated by a central connecting plate 82. The opposed internal faces of the top and bottom plate 80 and 81 are of a fixed configuration for each and all of the functional modules 34-38 in a preferred embodiment of the invention. The top plate 80 is molded, plastic member including a series of parallel passageways 83 extending longitudinally of the function module with some extending the total length with end and/or intermediate ports 84 and others extending only partially with appropriate ports 85, as shown in FIG. 13. The number and location of the passageways 83 and the porting 84-85 is selected to provide for all possible circuit connections required to the top plate in all the possible functional systems available to be made part of a total system, such that a single top plate is formed for all function modules, regardless of the function performed. The top plate 80 is preferably provided with a handle 86 for insertion and removal of the modules. The bottom plate 81 is a substantially similar molded plastic plate including a plurality of parallel passageways 87 which extend laterally or across the module and thus at substantially ninety degrees to the passageways 82 of the top plate 80. The bottom plate 81 includes ports 88 selectively located in communication with the opposite ends of the passageways and intermediate ports 89 to particular passageways, and generally including two or more ports to each passageway. The bottom plate 81 thus includes all ports necessary to produce the connections of flow lines to produce any one of the circuit designs used in the available control system. The bottom plate 81 also is molded as a universal plate unit for all function modules, such that the total plurality of function modules 34-38 for all functions use the common bottom plate structure. The ports not used are sealed by a suitable plug 67 or vented to atmosphere.

Figure 10:
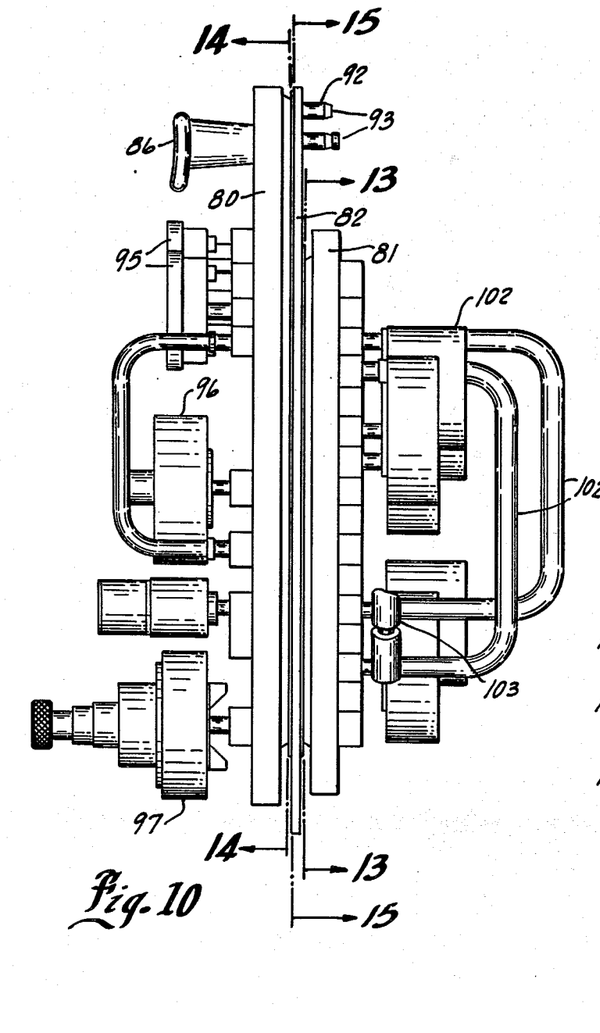
FIG. 10 is an enlarged side elevational view of a typical function module.

As shown in FIG. 15, the center plate 82 for the function module 34-38 is a flat plate having a plurality of appropriately and particularly spaced openings 91 which interconnect specific passageways 83 and 87 to create the particular function module. The top plate 80 and the center plate 82 extend beyond the bottom plate 81 as shown in FIG. 10, with the function module plug-in connector unit 92 located on the outer end portion thereof. The connection unit 92, as shown in FIGS. 10, 13 and 15, include the spigot connectors 93 secured to the center plate 82 and coupled to the internal passageways 83 in the top plate by openings 94 in the end of the passageways. Five different center plates 82 produce the five different function modules 34-38. The present invention includes a standarized circuit board for any given function wherein the circuit board can accommodate the wide variety of different specific circuits, with the direct connection of the logic and control device to the board.

To include the maximum number of the total variable systems which might be encountered in any given field of application, the number of family modules may, of course, be different. Further, in any given design, certain infrequently used sensors may be encountered and within a given family, a module with a center plate of different hole configurations may be used.

Each function module 34-38 is thus formed as an integrated structure with the three plates bonded by cured epoxy adhesive layers such as disclosed in the above identified U.S. Pat. No. 4,188,977.

The particular function module is designed and completed by connection of the appropriate circuit elements, such as a fluid diode, switches, adjustable set point restrictors, regulators and the like. The circuit elements are assembled to the module by a press fit connection to the several ports.

The function modules 34–38 are constructed as fixed assemblies which merely require releasable plug-in connection to the plug-in section or receptacle. The function modules 34–38 receives the input signal, except for manual adjustments, from the main manifold module and supply the output signal(s) to the main manifold module. Thus, the manifold module 32 functions as an interface between the function modules and the input sensors and the operating devices.

Each system includes the five function modules for (1) outdoor air sensing, (2) outdoor air control, (3) cooling control, (4) heating control and (5) humidity control, fan status detection and summer-winter logic. Any change in the system function is made by replacement of a module with a different, appropriate module. For example, to change the heating valve from closed to open in response to shut down, the heating function module is exchanged. Referring particularly to FIGS. 10-12, a particular functional module is illustrated. The top plate 80 includes transmitters 95 for distrubuting restricted supply air to various sensors. A signal repeater 96 is shown connected to selected passageways to transmit the signals with isolation between the passageways. Set point or signal adjustment units 97 and 98 are shown connected to the outer end of the module. The outer surface of the plate 81 includes suitable column indicia 99, shown as the letters A–H inclusive, and row indicia 100, shown as numbers 1–15, identify each of the passageways in the respective top and bottom plates, and permit identification of each connect port. The bottom plate 81 is similarly formed with suitable connecting components. Thus, a fluid diode 101 is shown connecting selected passageways while other passageways are directly connected by suitable tubing 102. A coupling restrictor 103 is shown providing a jumper connection to a port, while pressure repeaters 104 are shown connected to other ports. All of the ports not used are sealed by a suitable cap 105 or vented to atmosphere. The ports and passageways of the bottom plate are identified by column and row indicia 106 and 107 for identifying the location and connection to the several ports.

The several different function modules 34–38 have the identical connector patterns. In order to restrict addition of any given function module only to the corresponding connector of the manifold unit 32, an appropriate keying means is preferably provided. In the illustrated embodiment, notches 108 are provided in board 82 of the function modules which correspond to pins 109 on frame 31. These notches are unique to each module location and prevent, for example, the cooling module from being inserted in the heating module location.

The described modular control unit particularly adapts the design of heating, ventilating and air conditioning system to a computer generated analysis. The computer based analysis involves the presentation of a series of questions, with suggested prompting to the user to provide the appropriate answer. Based on the answers, the computer analyzes and determines the system function modules required as well as supporting and modifying devices, and the necessary interconnections to the control components and the field connections. After completion of a design, the computer will establish a listing of the related field equipment with instruction as to the connection to a completed control unit 30. The computer will also establish a list of all components and location for same the related assembly information for the control unit design selected by the computer to provide the required control functions requested. The control unit is then completely assembled and tested in the factory, in accordance with instructions created by the end as per interactive design input, prior to the shipment into the field. The computer will also provide a complete listing of the required adjustment and set point information.

The present invention thus provides a basically different approach to the design and the construction of fluid systems of varying degrees of complexity. The provision of families of basic plug-in fluid circuit boards to produce the various logic and control at the circuit board significantly minimizes the field system design, installation and control. Further, the production of the modules using a standarized circuit board permits construction of even relatively simple system at a competitive cost factor. The several advantages and features as set forth heretofore clearly distinguish this modular appropriate from the field wired system presently available to the end user.

Various modes in carrying out the invention are contemplated as being within the scope of the following claims, particularly pointing out and distinctly claiming the subject matter which is regarded as the invention.

We claim:

1. A modular pneumatic control apparatus for controlling an air conditioning system including a plurality of interrelated controlled devices adapted to be operated in a plurality of control modes in response to pneumatic operating signals, said devices being operable in different sequences in different systems, comprising a manifold circuit board having a plurality of different interface sections each including a multiple port module connector for supplying of operating and control signals and transmitting output signals to an output port connector, a plurality of funtion control modules for each of said interface sections, each of said function modules for each of said interface sections having a body member with a multiple input/output port connector arranged in the same configuration as the corresponding multiple port module connector and being constructed and arranged to respond to selected corresponding input signals on said manifold circuit board to operate the corresponding controlled devices and adapted to produce anyone of a plurality of control function sequences, each said body member of said function control modules including a flow control manifold member having flow passageways and including a plurality of external releasable connection means in said body member connected to said flow passageways, said releasable connection means establishing selective fixed physical attachment to said body member and said manifold member establishing fluid connection of a plurality of external logic and control devices to said body member and external fluid connected devices to define the control function and an integrated self-contained control sequence unit within said module responsive to an input signal at said input/output connector, said control sequence being defined by the selection of different external logic and control device.

2. The modular pneumatic control apparatus of claim 1 wherein each of said function modules includes top and bottom plate members abutting a common center plate including said multiple input/output port connector, said top plate of each of said modules having first corresponding connecting parallel lines and said bottom plate having second corresponding connecting parallel lines, said first and second parallel lines being substantially perpendicularly related to define an X-Y coordinate grid, said center plate for each interface section having a fixed configuration of opening establishing preselected connection of said parallel lines in said top and bottom plates for establishing selected response to said input signals and establishing control signals to said port connector and said center plates for different interface sections having different fixed configurations of each of said modules.

3. The modular pneumatic control apparatus of claim 1 or 2 wherein said manifold circuit-board has a fixed circuit configuration for all function control modules including interconnecting passageways connected to said module port connectors and to said output port connectors and including input/output ports.

4. The modular pneumatic control apparatus of claim 1 for controlling air handling units of heating, ventilating and air conditioning systems having condition sensors and air heating, cooling and humidifying devices, wherein said function control modules include a plurality of outdoor air sensing modules, a plurality of outdoor air control modules, a plurality of cooling control modules, a plurality of heating control modules and a plurality of humidifying control modules.

5. The modular pneumatic control apparatus of claim 4 wherein each of said function control modules include top and bottom plate members abutting a common center plate, said top and bottom plates each having a plurality of connecting passageways, said center plate having coupling openings establishing preselected connection of said connecting passageways in said top and bottom plates for establishing selected response to said input signals and establishing control signals to said input port sections, said different function modules having said top and bottom plates of the same construction and having center plates with different coupling openings and coupling ports interconnected to each other and to atmosphere and to logic and control devices to define the desired functional circuit, with other coupling ports not connected into the circuit sealed.

6. A modular pneumatic control apparatus adapted to control air handling equipment including heating units, cooling units, humidifier units, air damper units and air sensing units and each of said units operated in a plurality of control modes in response to pneumatic operating signals, comprising a manifold circuit board having a plurality of multiple input/output module connectors including one for each unit and a plurality of output port connectors for providing output fluid signals to said units, said module connectors each being connected to a preselected output port connector for establishing a predetermined control for a controlled unit, and a plurality of function control modules for each of said module connectors and said modules being separated into a plurality of module families, each of said family of modules defining a family operating modes for a controlled unit, each of said function control modules for each of said module connectors having a body member with a multiple input/output port connector arranged in the same configuration as the corresponding module connector and being constructed and arranged to respond to selected corresponding input signals on said manifold circuit board to develop output signals to operate the corresponding controlled unit and adapted to produce anyone of a plurality of different operating modes, said function control modules each including said body member having a flow control manifold member having flow passageways and including a plurality of external releasable connection means in said body member connected to said flow passageways, said releasable connection means establishing selective fixed physical attachment to said body member and said manifold member establishing fluid connection of a plurality of external logic nd control devices to said body member and external fluid connected devices to define the control function and integrated self-contained control sequence unit within said module responsive to an input signal at said input/out connector, said control sequence being defined by the selection of different external logic and control device.

7. The modular pneumatic control apparatus of claim 6 for controlling air handling units of a
    heating, ventilating and air conditioning systems including a 100% outdoor air system, a single path mixed air system and a dual path mixed air system having system condition sensors and air heating, cooling and humidifying devices, and air flow control means and an air flow fan wherein said module connectors for said functional modules include a plurality of outdoor air sensing modules, a plurality of outdoor air control modules, a plurality of cooling control modules, a plurality of heating control modules and a plurality of humidifying control modules.

8. The modular pneumatic control apparatus of claim 7 wherein said outdoor air sensing module is operable to sense the energy state of the outdoor air and compare such state to a reference level and generate a related logic output signal.

9. The modular pneumatic control apparatus of claim 8 including means to sense the energy state of the air from the system and to establish the level as the reference level.

10. The modular pneumatic control apparatus of claim 7 wherein said outdoor air control modules include input port means adpated to be connected to said outdoor sensing module and to the system condition sensor, and establish a plurality of control signals for operating said heating, cooling and humidifying means and said air flow control means, said outdoor air control modules including different particular air control modules having different fluid circuits to generate different output signals for selectively modulating natural cooling of the discharge air by outdoor air when the outdoor air contains less energy than the return air, establishing a minimum outdoor air ventilation when outdoor air contains more energy than return air, controlling the temperature of the mixture of outdoor air and return air, protecting against freezing of conditioning device due to low temperature, mixed air or fan shutdown in response to an input signal from a mixed air temperature sensor or fan status signal, establishing a signal connection warm-up or cool-down controller during morning warm-up or cool-down to prepare space which has been on night time energy conservation cycle for day time occupancy, controlling the discharge temperature of a preheat coil or cooling coil unit to prevent stratification or coil freezing.

11. The modular pneumatic control apparatus of claim 7 wherein said outdoor air control modules include input port means adapted to be connected to said outdoor sensing module and to the system condition sensor means and establish a plurality of control signals for operating said heating, cooling and humidifying means and said air flow control means, said cooling control module includes different particular cooling control modules having different fluid circuits for generating different output signals for selectively preventing coolant circulation if outdoor temperature is below an adjustable set point to prevent transient loads from using mechanical refrigeration when sufficient natural cooling is available, maintaining coolant circulation if outdoor temperature drops below a selected level to prevent coil freezing, conditioning the system whereby a humidity signal may override temperature signal to provide dehumidification, conditioning the system for switching a common heting and cooling unit in accordance with the output of outdoor air sensing module.

12. The apparatus of claim 11 wherein said system includes a dual input controller for establishing discharge control of the cooling device, said cooling control function modules establish the temperature and/or humidity sensors controlling the cooling device directly or through said discharge controller.

13. The modular pneumatic control apparatus of claim 7 wherein said outdoor air control modules include input port means adapted to be connected to said outdoor sensing module and to the system condition sensor and establish a plurality of control signals for operating said heating, cooling and humidifying devices and said air flow control means, air dampers, said heating control module includes different particular cooling control modules having different fluid circuits for generating different output signals for selectively controlling the air dampers when the outdoor temperature is below a selected level and modulating the cooling device when the outdoor temperature is above such level, controlling the operating mode of the heating device when the fan is not operating, conditioning system for heating to cooling changeover of a single heating and cooling device in response to the outdoor air sensing module and disable the dampers on fan failure.

14. The apparatus of claim 13 having a zone sensor and wherein said system includes a dual input controller for controlling the heating device and said heating control function modules establishes the zone sensor controlling the heating device directly or through the controller.

15. The modular pneumatic control apparatus of claim 7 wherein said outdoor air control modules include input port means adapted to be connected to said outdoor sensing module and to the system condition sensor means and establish a plurality of control signals for operating said heating, cooling and humidifying devices and said air flow control means, a fan said humidifier control function module includes different particular modules having different fluid circuits for generating different output signals for selectively and conjointly with said cooling module controlling dehumidification with said outdoor air sensing module transmitting the logic signal and establishing set points for humidification and dehumidification, and disabling the humidifying device in response to fan shut down.

16. The apparatus of claim 15 wherein said humidifying control function module includes an auxiliary signal output connected to said outdoor air sensing module and receives the fan status signal and transmits the signal to other function modules.

17. The modular pneumatic control apparatus of claim 7 including output signal modifying means connected to said manifold module and including means for changing the level of the output signal.

18. The modular pneumatic control apparatus of claim 17 wherein said modifying means includes signal reversing means.

19. The modular pneumatic control apparatus of claim 7 including input signal modifying devices connected to said manifold module establishing proportional control with set point and reset control.

20. the apparatus of claim 21 wherein said modifying device is a proportional plus integral controller.

21. A pneumatic signal control apparatus for operating air handling equipment comprising a base frame support, a manifold plate unit secured to said support and including input/output port connectors having input ports for receiving condition signals and output ports for connection to the air handling equipment, said manifold plate including a plurality of different function modules connectors, a family of function modules for each of said connectors and having complementary connectors, and each of said family of function modules being constructed to control different components of said air handling equipment and each module within a given family establishing some different control of said components, said function control modules each including a body member having a flow control manifold member having flow passageways and including a plurality of external releasable connection means in said body member connected to said flow passageways, said releasable connection means establishing selective fixed physical attachment to said body member and said manifold member establishing fluid connection of a plurality of external logic and control devices to said body member and external control sequence unit within said module responsive to an input signal at said input/output connector, said control sequence being defined by the selection of different external logic and control devices.

22. The control apparatus of claim 21 including input signal modifying devices secured to said frame and connected to said manifold module to modify selected input signals.

23. The control apparatus of claim 21 including output signal modifying devices supported by said frame and connected to said manifold module to modify selected output signals.

24. The apparatus of claim 21 wherein said manifold plate is a flat plate-like rectangular unit having said input/output port connector distributed along one edge portion of the plate and said function module connector distributed along the opposite edge portion of the plate, said function module connectors and the connectors on said function modules being complementary plug-in connections, said function modules of each family of function modules having a unique locating means to limit the connection thereof to a particular function module connector.

* * * * *

UNITED STATES PATENT AND TRADEMARK OFFICE
CERTIFICATE OF CORRECTION

PATENT NO. : 4,456,168
DATED : June 26, 1984
INVENTOR(S) : RICHARD N. LAAKANIEMI ET AL It is certified that error appears in the above-identified patent and that said Letters Patent are hereby corrected as shown below:

Col. 7, line 1, cancel "12" and substitute therefore ---32---,
Col. 9, line 11, Before "C-7510" insert ---C-7500---, Col. 16, line 7, cancel "nd" and substitute therefore ---and---, Col. 16, line 39, cancel "adpated" and substitute therefore ---adapted---, Col. 16, line 41, after "sensor" delete "," (comma), Col. 17, line 50, after "fan" insert ---,---(comma)

Signed and Sealed this

Nineteenth Day of March 1985

[SEAL]

Attest:

DONALD J. QUIGG

Attesting Officer

Acting Commissioner of Patents and Trademarks